Dec. 16, 1958 J. W. GRATIAN 2,864,893

MAGNETIC RECORDING HEAD

Filed Nov. 30, 1953 2 Sheets-Sheet 1

INVENTOR.
JOSEPH W. GRATIAN

BY Philip S. Shurdy

HIS AGENT

Dec. 16, 1958 J. W. GRATIAN 2,864,893

MAGNETIC RECORDING HEAD

Filed Nov. 30, 1953 2 Sheets-Sheet 2

United States Patent Office
2,864,893
Patented Dec. 16, 1958

2,864,893

MAGNETIC RECORDING HEAD

Joseph W. Gratian, Rochester, N. Y., assignor, by mesne assignments, to General Dynamics Corporation, a corporation of Delaware Application November 30, 1953, Serial No. 394,929
9 Claims. (Cl. 179—100.2)

My invention relates to magnetic recording, and more particularly to a head for perpendicular recording.

Many applications of magnetic recording apparatus require D.-C. response. Heretofore, magnetic recording systems have been incapable of providing D.-C. response without more complex apparatus such as a "dithering" head or the use of frequency modulation. Even with a cathode-ray tube type of reproducing head, which provides a voltage output which is directly proportional to signal flux rather than to the time-derivative of flux, D.-C. response cannot be achieved with a longitudinal or ring-type core structure. I have found, however, that D.-C. response can be achieved through the use of the cathode-ray type of head and a perpendicular type pickup core, and that the perpendicular type of head affords more uniform frequency response in many applications, even when used in a conventional wound-type of head.

It is accordingly an object of my invention to provide a new and useful perpendicular type of head for magnetic recording apparatus.

It is also an object of my invention to provide a perpendicular type of magnetic recording head which avoids phase distortion, yet which maintains its frequency response in the middle and high frequency ranges.

In general, I may accomplish the foregoing and other objects of my invention by centering the magnetic recording medium in the airgap of the perpendicular head, and I may also provide magnetic means for shunting the flux from that portion of the magnetic medium adjacent to the airgap away from the airgap.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which Fig. 1 is a top view of one embodiment of my invention, shown in a magnetic recording apparatus, the latter being indicated schematically;

Figure 1:
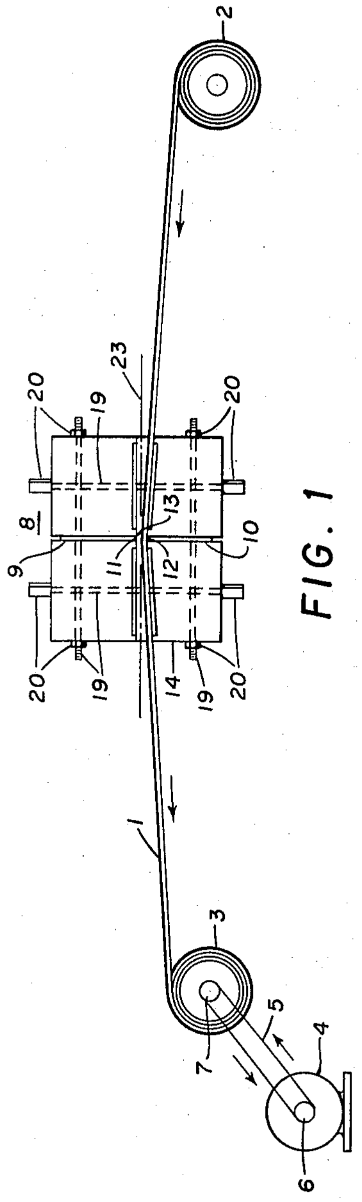
Figure 3:
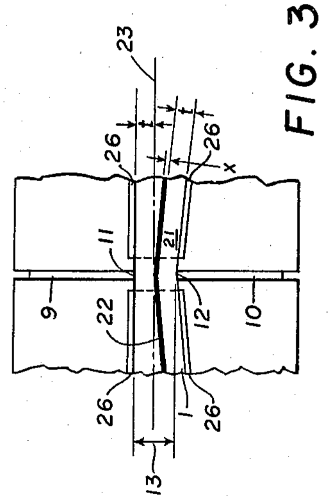
Fig. 3 is an enlarged view of a portion of the embodiment of Fig. 1, useful in understanding my invention.

There is shown in Fig. 1 a magnetic recording medium 1, illustrated as being a magnetic recording tape, which is arranged to be unwound from storage reel 2 onto take-up reel 3. The motive power for the transport of medium 1 may be provided by motor 4 driving take-up reel 3 through the medium of belt 5 which passes over pulleys 6 and 7. Those skilled in the art can readily comprehend that the components thus far identified may be supported relative to each other by any suitable means. Such means are to be found in any conventional magnetic recording apparatus, and therefore it has not been felt necessary to describe them in the present specification.

There is provided, in accordance with my invention, a head indicated generally by reference numeral 8. Head 8 is provided with a pair of pole pieces 9 and 10 having pole faces 11 and 12, respectively. Pole faces 11 and 12 define an airgap 13 therebetween. Head 8 is arranged such that magnetic medium 1 is transported through airgap 13.

Figure 2:
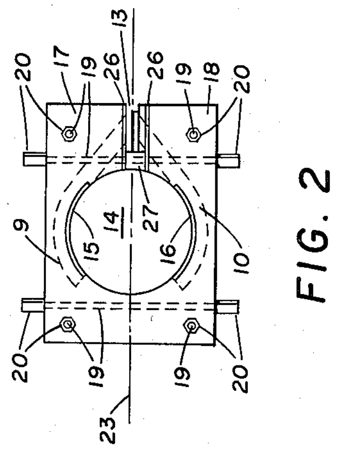
Fig. 2 is an elevational view of the embodiment of Fig. 1.

I have chosen in the following description to illustrate my invention as applied to a cathode-ray tube type of magnetic recording pickup head. The cathode-ray type of pickup head is described in copending application, Serial Number 335,502, filed February 6, 1953, Joseph W. Gratian and Norman Cole, and assigned to the same assignee as the present invention. As indicated in Figs. 1 and 2, an opening 14 is provided for the cathode ray tube. Curved plates 15 and 16 serve to transfer flux from pole pieces 9 and 10, respectively, to the cathode ray tube. Those skilled in the art can appreciate, of course, that my invention is applicable to other types of heads.

I prefer that pole pieces 9 and 10, together with plates 15 and 16, be embedded in a plastic mass in order to preserve the spatial relationship between them. For convenience in manufacture, however, I prefer that pole piece 9 and plate 15 be embedded in one mass 17, while pole piece 10 and plate 16 may be embedded in a second mass 18. Those skilled in the art are aware, of course, that the embedding material need not be plastic, since other non-magnetic materials may be employed; however, a plastic material is advantageous from a manufacturing standpoint. After casting the plastic, masses 17 and 18 may each be machined to appropriate dimensions, after which they may be clamped together in the position shown by means of struts 19 passing through the plastic and nuts 20 which are threaded onto the ends of struts 19.

There is provided, in accordance with my invention, means for positioning the magnetic recording medium 1 in airgap 13. In the illustrated embodiment, magnetic recording medium 1 comprises a non-magnetic portion, or base 21, which is usually made of plastic. One side of the non-magnetic portion carries a coating of a magnetic oxide 22, the latter comprising the magnetically active portion of magnetic recording medium 1. In accordance with my invention, magnetic recording medium 1 is positioned so that the magnetically active portion 22 is centered in airgap 13.

In the illustrated embodiment of my invention, non-magnetic portion 21 has a thickness $t$. The length of airgap 13 is made equal to $2t$ plus the thickness $x$ of the magnetically active portion 22 of medium 1. Putting the matter another way, the non-magnetic portion is substantially half as thick as the length of airgap 13 minus the thickness of magnetically active portion 22. The centered relationship is maintained by contouring pole face 12 and its adjacent portions in the angular relationship shown to the opposite pole face and adjacent portions as shown. By placing reels 2 and 3 somewhat below center line 23 (as viewed in the drawing) of airgap 13, sufficient pressure is placed on medium 1 to cause non-magnetic portion 21 to bear continuously against pole face 12 of pole piece 10 and thereby maintain the centered relationship set forth above. Those skilled in the art can readily understand, of course, that other means may be employed to maintain the magnetically active portion 22 of magnetic recording medium 1 centered in the airgap without departing from the spirit or scope of my invention.

Figure 4:
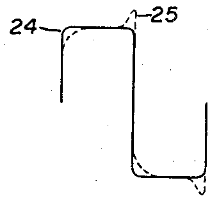
Figs. 4–6 are likewise drawings useful in understanding my invention.

The advantage of centering the magnetically active portion in the airgap is revealed in Fig. 4. A square wave 24 recorded on a length of magnetic recording medium 1 is reproduced as curve 25 on conventional magnetic structures used with cathode-ray tube units. Phase distortion is obvious. With the illustrated embodiment of my invention, however, wave form 24 is faithfully reproduced, phase distortion being absent.

Further in accordance with my invention, I provide magnetic means for shunting the flux from that portion of the magnetic medium which is adjacent to the airgap away from the airgap. I prefer that this magnetic means be a U-shaped shunt having legs 26 and bottom connecting member 27. With this arrangement, the magnetic recording medium may be arranged to pass through the confines of the U, that is, between legs 26.

As pointed out earlier, those portions of head 8 adjacent to pole face 12 are preferably contoured as shown to allow the uncoated face of non-magnetic medium 21 to bear against pole face 12 at all times. Therefore legs 26 of the shunt are preferably formed at a suitable angle to one another, such as that shown.

Figure 5:
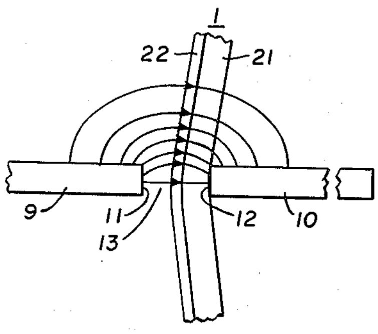

Fig. 5 illustrates a typical flux pattern when no shunts are used. Flux from those portions of the tape well away from the portion immediately under pole faces 11 and 12 obviously contribute to the flux picked up by the pole pieces and is thus communicated to the cathode-ray pickup means. This circumstance may perhaps be more readily comprehended if the well known principles of reciprocity are applied; thus, pole pieces 9 and 10 may be considered as the source of flux and their effects on magnetic recording medium 1 studied as a result.

Figure 6:
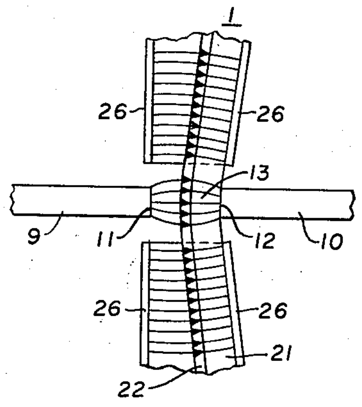

The advantage of a shunt near the airgap is graphically illustrated in Fig. 6. There it may be seen that only the flux emanating from the tape between pole faces 11 and 12 is picked up in pole pieces 9 and 10. The flux from the region adjacent to the airgap is prevented from reaching the airgap because the shunt shortcircuits it.

For best results, I prefer that a shunt be placed at the side of the airgap to prevent the undesired influence of flux from relatively remote portions of the tape reacting on airgap 13. In this way, the gradual and continuous rise in low-frequency response which is characteristic of conventional reproducing heads is avoided, because only the flux immediately between the pole faces is picked up for reproduction, and flux from other portions of the tape is kept away from the airgap.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In magnetic recording apparatus, the combination of a head having a magnetic circuit including a pair of pole faces defining an airgap therebetween, said head being arranged for perpendicular magnetic recording operations; a longitudinal magnetic recording medium comprising a magnetically active portion secured to one side of a non-magnetic portion; means for transporting said medium through said airgap, and means for centering said magnetic portion in said airgap.

2. The combination of claim 1 in which said non-magnetic portion is substantially half as thick as the length of said airgap minus the thickness of said magnetically active portion; and the bare side of said non-magnetic portion bears against one of said pole faces.

3. In a magnetic recording apparatus, the combination of a head having a magnetic circuit including a pair of pole faces defining an airgap therebetween, said head being arranged for perpendicular magnetic recording operations; a longitudinal magnetic recording medium; means for transporting said medium through said airgap; and magnetic means for shunting the flux from that portion of said medium adjacent to said airgap away from said airgap, said shunt remaining in a fixed position with respect to said airgap.

4. In a magnetic recording apparatus, the combination of a head having a magnetic circuit including a pair of pole faces defining an airgap therebetween, said head being arranged for perpendicular magnetic recording operations; a longitudinal magnetic recording medium; means for transporting said medium through said airgap; and magnetic means for shunting the flux from said portion of said medium adjacent to said airgap away from said airgap, said magnetic means comprising a U-shaped shunt, said shunt being located such that said medium passes through the confines of said U.

5. The combination of claim 4 in which said magnetic recording medium is a magnetic recording tape and the legs of said U are adjacent to, but spaced from, the sides of said tape.

6. The combination of claim 4 in which said shunt has a length which is long in comparison with the distance between the legs of said U, and the length dimension of said shunt is substantially parallel to the longitudinal dimension of said medium.

7. In a magnetic recording apparatus, the combination of a head having a magnetic circuit including a pair of pole faces defining an airgap therebetween, said head being arranged for perpendicular magnetic recording operations; a longitudinal magnetic recording medium comprising a magnetically active portion secured to one side of a non-magnetic portion; means for transporting said magnetic recording medium through said airgap; means for centering the magnetically active portion of said magnetic recording medium in said airgap; said head having magnetic means for shunting the flux from that portion of said magnetically active portion adjacent to said airgap away from said airgap, said shunt remaining in a fixed position with respect to said airgap.

8. In a magnetic recording apparatus, the combination of a head having a magnetic circuit including a pair of pole faces defining an airgap therebetween, said head being arranged for perpendicular magnetic recording operations; a longitudinal magnetic recording medium comprising a magnetically active portion secured to one side of a non-magnetic portion; means for transporting said magnetic recording medium through said airgap; means for centering the magnetically active portion of said magnetic recording medium in said airgap; said head having magnetic means for shunting the flux from that portion of said magnetically active portion adjacent to said airgap away from said airgap, said magnetic means comprising a U-shaped shunt, said shunt being located such that said magnetically active portion of said medium passes through the confines of said U.

9. The combination of claim 8 in which said magnetic means comprises a shunt formed by impregnating a plastic material with carbonyl iron powder.

References Cited in the file of this patent

UNITED STATES PATENTS

| | | |
|---|---|---|
| 1,466,750 | Peterson | Sept. 4, 1923 |
| 2,277,305 | Clopton | Mar. 24, 1942 |
| 2,317,199 | Kirschbaum | Apr. 20, 1943 |
| 2,419,195 | Begun | Apr. 25, 1947 |
| 2,423,339 | Newman | July 1, 1947 |